Feb. 28, 1950 P. N. BOSSART 2,499,180

COMMUNICATION SYSTEM

Filed June 25, 1946 3 Sheets-Sheet 1

INVENTOR.
Paul N. Bossart.
BY
HIS ATTORNEY.

Feb. 28, 1950 P. N. BOSSART 2,499,180

COMMUNICATION SYSTEM

Filed June 25, 1946 3 Sheets-Sheet 2

INVENTOR.
Paul N. Bossart.
BY
[signature]
HIS ATTORNEY.

Feb. 28, 1950 P. N. BOSSART 2,499,180

COMMUNICATION SYSTEM

Filed June 25, 1946 3 Sheets-Sheet 3

INVENTOR.
Paul N. Bossart.
BY
HIS ATTORNEY.

Patented Feb. 28, 1950 2,499,180

UNITED STATES PATENT OFFICE 2,499,180

COMMUNICATION SYSTEM

Paul N. Bossart, Cheswick, Pa., assignor to The Union Switch & Signal Company, Swissvale, Pa., a corporation of Pennsylvania Application June 25, 1946, Serial No. 679,099

15 Claims. (Cl. 246—8)

Figure 1A:
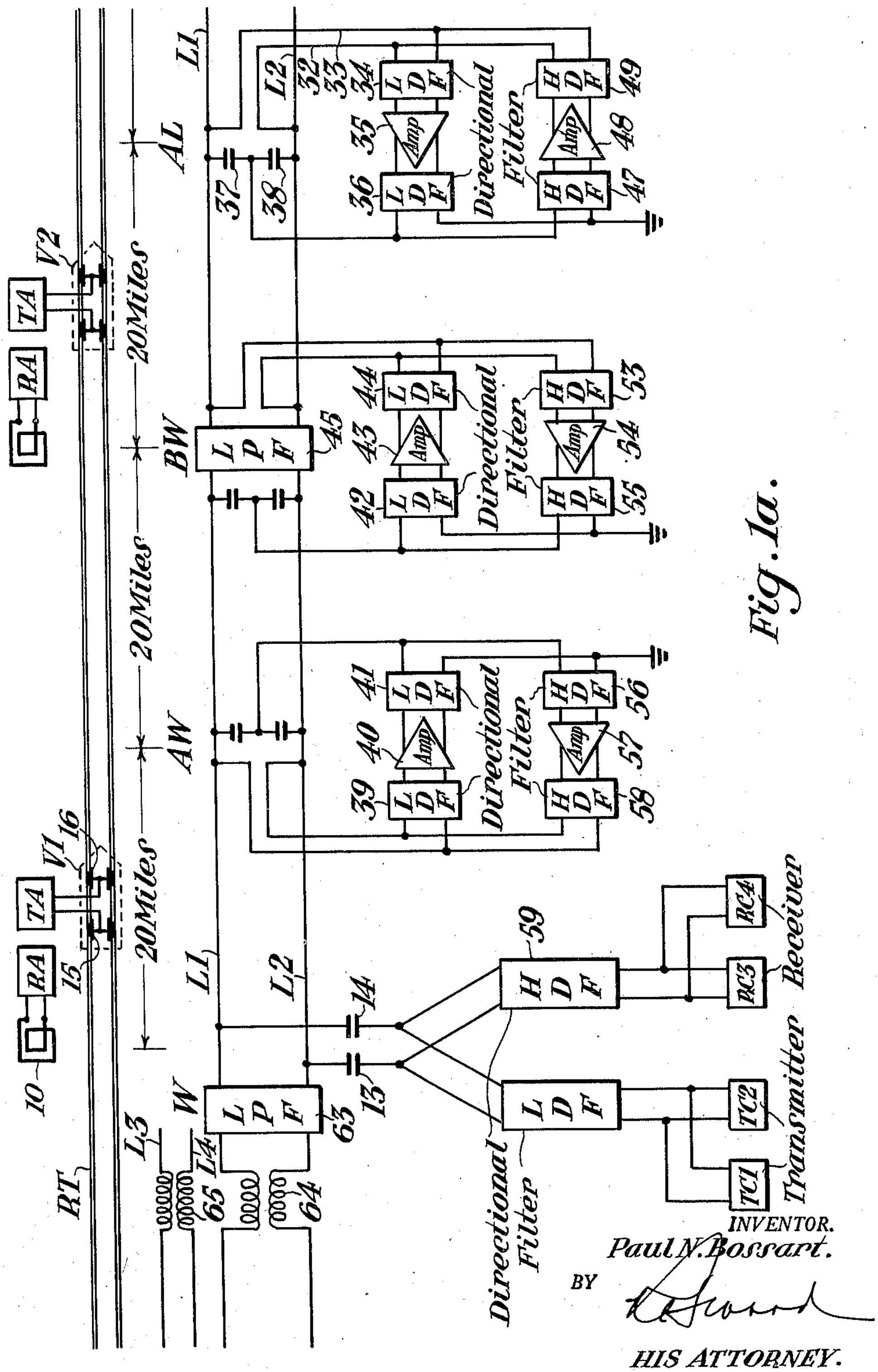

My invention relates to communication systems, and more particularly to inductive carrier communication systems for vehicles operating over a given trackway.

One of the purposes of a communication system for vehicles operating over a given trackway is to provide communication between a terminal station and the vehicles en route. Under such circumstances, the required range of transmission varies greatly. For example, in railway train communication systems the range between a terminal station and a train carried station will vary greatly because the operating division of the railway will comprise one to two hundred miles of track.

Also in communication systems of the type here contemplated, a plurality of different channel frequencies may be required so that a plurality of two way or duplex conversations may be carried on simultaneously through a common transmitting channel.

Furthermore, the amount of power that may be sent out for inductive carrier communication may be limited by government regulation and the range of transmission of the energy originally supplied may be insufficient to reach remote vehicles.

Accordingly, a feature of my invention is the provision of novel and improved means to extend the range of transmission of an inductive carrier communication system.

Another feature of my invention is the provision of communication equipment of the type herein involved incorporating improved means to provide duplex or two way service on a plurality of different frequency channels simultaneously.

Still another feature of my invention is the provision of inductive carrier communication systems incorporating novel and improved repeater equipment whereby a terminal station at one end of an extended trackway can communicate with a vehicle en route.

Again, a feature of my invention is the provision of improved means wherewith carrier communication energy is amplified and repeated at locations along a trackway by transferring the energy from transverse to longitudinal circuits of a pair of line wires and vice versa alternately.

A more specific feature of my invention is the provision of carrier inductive railway train communication systems incorporating improved means whereby terminal stations, one at each end of a railway division, can each keep in touch with trains en route for a given adjacent portion of the division with an overlapped stretch where a train can communicate with either station.

Another feature of my invention is the provision of a railway train communication system wherewith trains of a division can communicate with each other as well as keeping in touch with terminal stations.

Other features, objects and advantages of my invention will appear as the specification progresses.

The foregoing features, objects and advantages of my invention I attain through the provision of longitudinal and transverse circuits of a pair of line wires extending along a trackway over which vehicles operate, together with sectionalizing and repeater means at preselected points along the trackway to determine the limits of the longitudinal and transverse circuits. The two line wires in parallel, the distributed capacitance and conductance of the line wires to ground and the ground path form a so-called longitudinal circuit and such a circuit will be thus called throughout the present specification and claims. The line wires when used in series form a metallic or so-called transverse circuit and in the specification and claims I shall use the term transverse circuit to designate the circuit formed by the line wires in series.

The two line wires are mounted parallel to and reasonably close to the trackway and the longitudinal circuit formed by the line wires is inductively associated with vehicle carried elements or circuits. Wayside or terminal station equipment is connected or coupled to the line wires to send and receive the communication current therethrough. The field set up from the transverse circuit is 40 db. or more below that set up from a longitudinal circuit so that a great deal more power may be fed into a transverse circuit without exceeding the so-called government low power rule limiting the field to 15 microvolts per meter at a distance normal to the line of one electrical radian. The longitudinal balance of a pair of line wires is usually 35 to 40 db. or better, so that repeater gain up to this amount may be used without resulting in feed back sufficient to cause instability. If line circuit attenuation is about 1 db. per mile, then repeaters can be spaced 25 to 30 miles and the range of transmission extended.

Each repeater equipment here provided includes an amplifier and a filter and the several repeater equipments are connected to the pair of line wires as necessary to transfer the communication energy from the transverse to the longitudinal circuit and vice versa alternately. In this way the range of transmission can be extended to cover an entire division of trackway. For example, a railway division of, say, 200 miles with terminal stations at the east and west ends would be covered by repeaters every 20 miles and service provided from the east terminal to all trains for 120 miles adjacent that terminal, and from the west terminal for all trains for 120 miles adjacent that terminal. This arrangement provides an overlap of 40 miles in which either terminal station can communicate with a train. The purpose of such an overlap is that if a conversation starts, say, 95 miles from the terminal at the east end of the division with a westbound train, the conversation might last for many minutes so that at the time it was completed the train might be 115 miles from the terminal. Without such an overlap there would be danger of interrupting the communication between a train and a terminal station by the train moving out of the range of that station before communication can be established with the other station.

Two way service is provided between wayside or terminal stations and vehicles en route on any desired number of communication channels simultaneously through the use of different carriers and filters. In one embodiment of the invention each two way conversation is effected by using one carrier frequency of a low group of carrier frequencies for transmission from a terminal station to the vehicles and one frequency of a high group of carrier frequencies for transmission from the vehicles to the terminal stations.

In another embodiment of the invention, one group of carrier frequencies is used for all transmissions from east to west along a trackway and another group of carrier frequencies is used for all transmissions from west to east. In this latter scheme, an operator on board a train wishing to talk to the west would use a carrier frequency in the "west" group and if he wishes to talk east he would use a carrier frequency in the "east" group. The reply to a message will be effected by using a frequency of the other group. At a terminal the choice of the group of frequencies to be used will depend upon the terminal being at the east or west end of the division.

Each repeater equipment is arranged with two circuit channels, one channel including a filter and an amplifier disposed to pass the carrier frequency used for transmission in one direction and the other channel including a filter and an amplifier disposed to pass the carrier frequency used for transmission in the other direction. That is, each circuit channel of a repeater equipment is made directional in character by the filter and amplifier that make up the circuit channel.

I shall describe two forms of apparatus embodying my invention, and shall then point out the novel features thereof in claims.

Figure 1B:
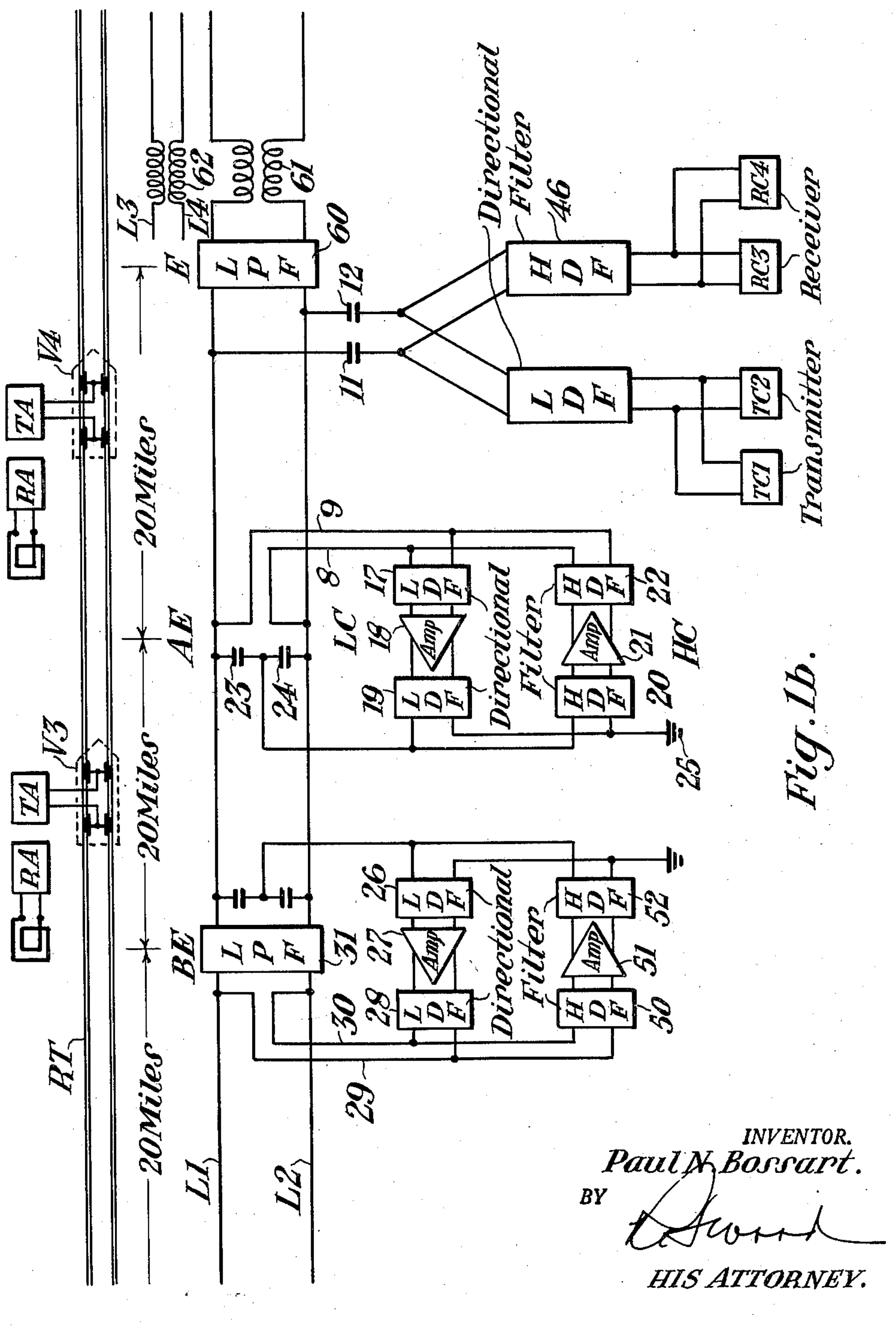
Figure 2:
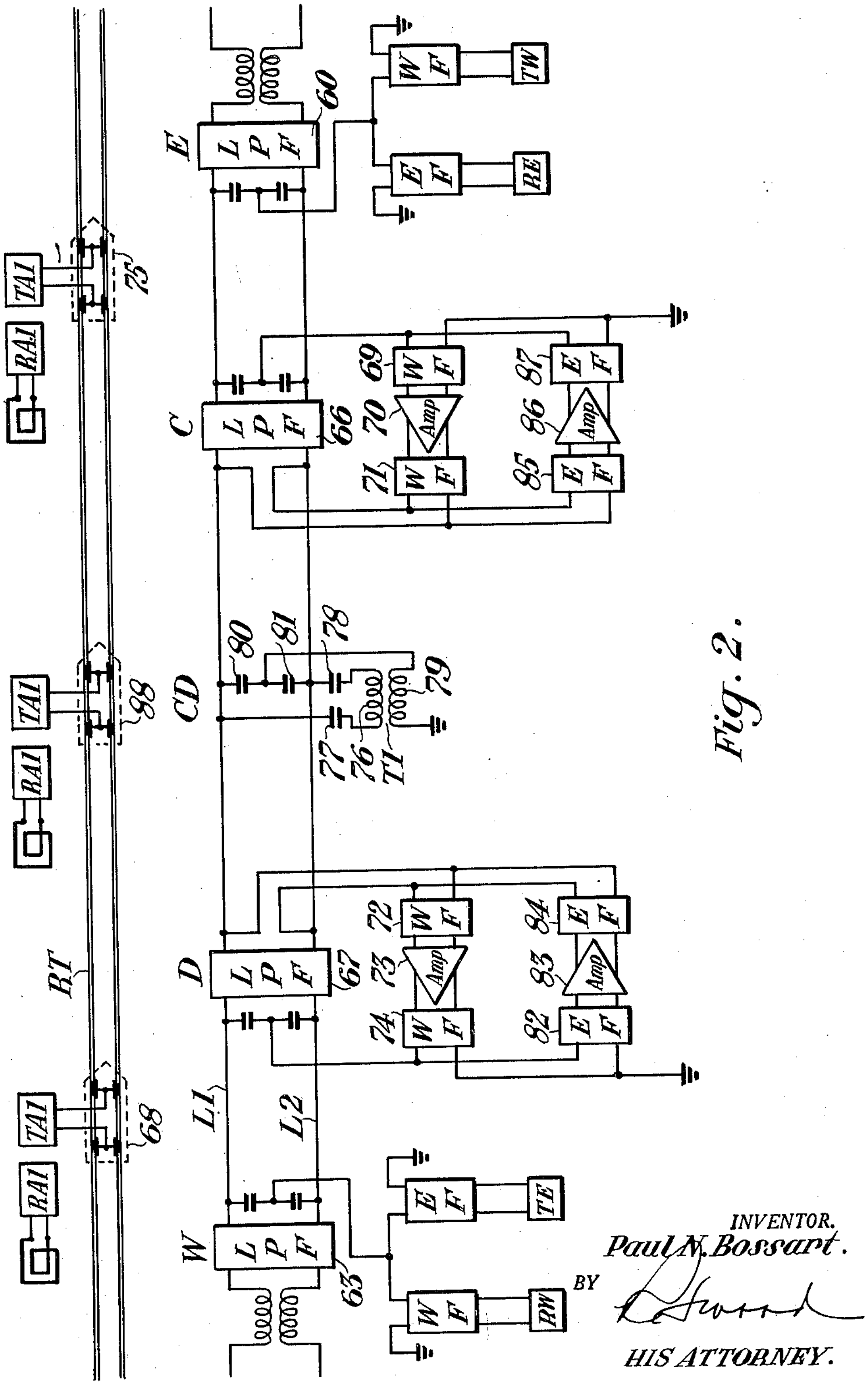

In the accompanying drawings, Figs. 1*a* and 1*b* when placed end to end with Fig. 1*a* at the left, are a diagrammatic view showing one form of apparatus embodying my invention when used in a railway train communication system and wherein a first or low group of carrier frequencies are used for transmission from a terminal station to trains and a second or high group of carrier frequencies are used for transmission from trains to the terminal stations. Fig. 2 is a diagrammatic view showing a form of apparatus embodying my invention when used in a railway train communication system and wherewith duplex service is obtained by using a first carrier frequency or group of frequencies for all transmissions east and a second carrier frequency or group of frequencies for all transmissions west.

In each of the different views like reference characters are used to designate similar parts.

It is understood that my invention is not limited to railway train communication systems and this one application illustrates the many places the equipment is useful.

Referring to Figs. 1*a* and 1*b*, the reference character RT designates a railway track extending between two divisional terminals E and W. Such a division would be of the customary length and to aid in the understanding of the invention I shall assume the division to include 120 miles of track. The railway may be a single track line or the track RT may be one track of a multiple track railway. I shall further assume that the track RT is an eastbound track of a multiple track line and the several trains designated V1, V2, V3 and V4 are eastbound en route over track RT, and each of which trains has at least one vehicle provided with communication equipment.

The reference characters L1 and L2 designate a pair of line wires extending along the railway. These line wires would be carried on the usual pole line and would extend substantially parallel to and reasonably close to the track RT. That is, the line wires L1 and L2 extend continuously throughout the territory covered by the communication system and are at all times within effective inductive range of the track. This pair of line wires may be used in existing telegraph or similar service and are used for train communication as an additional service without interference with their present use. The line wires L1 and L2 may be of course installed for train communication use only. It is to be observed that the same pole line may carry additional line wires, such as line wires L3 and L4, fragments of which are shown adjacent terminals E and W.

As will be pointed out as the specification progresses, the line wires L1 and L2 are sectionalized and arranged in transverse and longitudinal circuits for conveying the train communication current along the railway but are retained as a series circuit for their present use.

The east terminal station E and the west terminal station W and each train operating over the division are provided with two way communication equipment comprising transmitting apparatus and receiving apparatus which are shown conventionally for the sake of simplicity since the specific structure of these apparatuses forms no part of my invention.

As stated hereinbefore, in the embodiment of the invention disclosed in Figs. 1*a* and 1*b*, a first or low group of carrier frequencies are provided for transmission from terminal stations to trains and a second or high group of carrier frequencies are provided for transmission from trains to terminal stations, so that a plurality of conversations can be carried on simultaneously. I shall assume for illustration that the low group comprises carriers C1 and C2 of frequencies *f*1 and *f*2, respectively, and the high group comprises carriers C3 and C4 of frequencies *f*3 and *f*4, respectively. Thus, in the case here used for illustration, two two-way or duplex conversations can be carried on simultaneously, one conversation using, say, carriers C1 and C3 and the other using carriers C2 and C4. It is to be understood that each group of carriers can include additional carriers if additional conversations are needed.

Under the carrier groups here used for illustration, the terminal station E is provided with transmitting apparatus which comprises two transmitters TC1 and TC2 for sending on the carriers C1 and C2, respectively; and with receiving apparatus which comprises two receivers RC3 and RC4 for receiving on the carriers C3 and C4, respectively. Such transmitters and receivers as well as other transmitters and receivers referred to hereinafter may be, for example, similar to those disclosed in Letters Patent of the United States No. 2,064,639, granted December 15, 1936, to L. D. Whitelock et al., for Communicating systems, or to the arrangements disclosed in my copending application for Letters Patent of the United States, Serial No. 575,311, filed January 30, 1945, now Patent No. 2,484,680, dated October 11, 1949, for Railway train communication systems.

The transmitters TC1 and TC2 in parallel are connected across the line wires L1 and L2 through a directional band pass filter LDF and blocking capacitors 11 and 12. The filter LDF at station E as well as all other filters identified by the reference character LDF, to be referred to hereinafter, are proportioned to pass a frequency band including the low carrier group C1 and C2 and to suppress frequencies outside of such group. The capacitors 11 and 12 would pass all carrier frequencies here used but block direct current and very low frequency currents used in telegraph and other circuits completed through the line wires L1 and L2. Similarly, the receivers RC3 and RC4 at station E in parallel are connected across the line wires L1 and L2 through a directional band pass filter HDF and the capacitors 11 and 12. The filter HDF at station E, as well as all other similar filters referred to hereinafter, are proportioned to pass the frequency band including the high group of carriers C3 and C4 and to suppress frequencies outside of such group. In other words, the filter LDF serves to pass only the low group of carrier frequencies sent out from the terminal station E and the filter HDF serves to pass only the high group of carrier frequencies received at terminal E, and to such extent these filters are directional.

The terminal station W is provided with similar equipment, the transmitting apparatus including two transmitters TC1 and TC2 which are connected in parallel across the line wires L1 and L2 through a directional band pass filter LDF and blocking capacitors 13 and 14, and the receiving apparatus including two receivers RC3 and RC4 which are connected in parallel across the line wires through a directional band pass filter HDF and the blocking capacitors 13 and 14. It is to be seen, therefore, that each terminal station E and W is equipped to send on either of the low group carriers C1 and C2 and to receive on either of the high group carriers C3 and C4, and each terminal equipment is connected to the line wires in a transverse circuit.

The communication equipment of each train is similar to that provided at the terminal stations, except as to the tuning. Taking train V1, for example, its equipment comprises transmitting apparatus shown conventionally at TA and receiving apparatus shown conventionally at RA. The transmitting apparatus TA would include two transmitters capable of sending on the carrier frequency C3 and C4, respectively, and the receiving apparatus RA would include two receivers capable of receiving the carrier frequency C1 and C2, respectively.

Still referring to train V1, its receiving and transmitting apparatuses are connected to circuit elements which are electrically coupled to the trackway transmitting channel. The receiving apparatus RA is connected to an air core coil 10 and the transmitting apparatus TA is connected to a sending circuit which includes two spaced pairs of wheels 15 and 16 of the train. The coil 10 is mounted for inductive relation with the track rails and conductors paralleling the rails. Current supplied by the transmitting apparatus TA flows in the rails between the two pairs of wheels 15 and 16 and the voltage drop developed across this length of rail causes current to flow in the rails each side of the train and the distributed rail to ground impedance and energy is transferred to the line wires L1 and L2 in multiple due to the distributed inductance between the line wires and the rails. Such transfer of energy to and from train carried apparatus and the trackway transmitting channel including the longitudinal circuit of the line wires is fully explained in my Letters Patent of the United States No. 2,064,642, granted December 15, 1936, for Railway train communication systems. Thus both the receiving apparatus RA and the transmitting apparatus TA of train V1 are inductively associated with the longitudinal circuit of the line wires L1 and L2. Each of the other trains is provided with communication apparatus similar to that of train V1.

Repeater equipment is provided at a plurality of preselected points through the division to extend the range of transmission and thereby provide communication between the terminal stations and a train at any point along the railway.

On the assumption that the terminal stations E and W are 120 miles apart and service is desired from the east terminal E to all trains within 80 miles of that terminal and from the west terminal W to all trains within 80 miles of that terminal, repeater points AE and BE 20 and 40 miles, respectively, from terminal E; repeater points AW and BW 20 and 40 miles, respectively, from terminal W; and a repeater point AL midway between the points BW and BE, are provided. With this arrangement an overlap of 40 miles in which either terminal can talk to a train is provided, the purpose of such overlap being explained hereinbefore. While a specific spacing of the repeater points is shown in the drawings, it is understood that the invention is not limited to this one spacing and other spacings can be used.

Each repeater equipment includes two separate channels, one for repeating the energy transmitted from the terminal stations to the trains and the other for repeating the energy transmitted from the trains to the terminal stations. Looking at the repeater point AE, for example, the repeater equipment includes a first circuit channel LC and a second circuit channel HC. The channel LC includes low directional band pass filters 17 and 19 and an amplifier 18. The filters 17 and 19 are LDF filters proportioned to pass the low carrier group. The amplifier 18 would be of standard arrangement disposed with its input connected to the output of the filter 17 and its output connected to the input of the filter 19. Thus this circuit channel LC is disposed to pass only energy of the low carrier group from the station E to trains west of the repeater point AE. Similarly, the second circuit channel HC includes high directional band pass filter 20, an amplifier 21 and another high directional band pass filter 22. The amplifier is interposed in the second channel HC so that energy is transmitted from trains between terminal station E and repeater point BE toward the terminal station E. Each of the other repeater equipments includes two circuit channels similar to the two just described for the equipment at the repeater point AE.

The connections of each repeater equipment to the line wires L1 and L2 are arranged as necessary for transferring energy from the transverse circuit to the longitudinal circuit and vice versa, such connections being explained more fully as the operation of the apparatus is described.

In describing the operation of the apparatus of Figs. 1*a* and 1*b*, I shall first assume that the operator at the east terminal E desires to talk to some train within 80 miles of that terminal station. I shall further assume that this conversation between the station E and the train is effected by the use of carrier C1. The operator at station E on selecting the transmitter TC1 causes energy to be applied to the line wire in the transverse circuit and the energy flows in the transverse circuit to the first repeater point AE. This energy, attentuated by the line drop of 20 miles of the line circuit is taken off the transverse circuit by wires 8 and 9 and is passed by the first circuit channel LC of the repeater equipment. After being amplified the energy is applied to the line wires L1 and L2 in a longitudinal circuit, the connection being completed between ground electrode 25 and the junction terminal of capacitors 23 and 24 connected in series across the line wires. The outgoing carrier energy thus applied to the longitudinal circuit at repeater point AE will flow both east and west and will be available to inductively influence the receiving apparatus of train V3 en route somewhere between repeater points AE and BE and also the receiving apparatus of train V4 en route somewhere between terminal E and the repeater point AE.

The attentuated energy is taken off the longitudinal circuit at the repeater point BE and is passed through the circuit channel including a low carrier directional filter 26, amplifier 27 and a low carrier directional filter 28. After amplification the output is passed to a transverse circuit of the line wires through wires 29 and 30.

At the repeater point BE a low pass filter 31 is interposed in the line wire and proportioned to pass direct current and very low frequency currents, such as are used in the telegraph, voice frequency telephone, and other circuits completed through the line wires but to block the carrier frequency energy here used for communication. The purpose of the low pass filter 31 is to prevent the repeater equipment BE receiving communication energy from wayside stations west and vehicle stations east.

The twice amplified energy is transmitted from the repeater point BE over the transverse circuit to the repeater point AL where it is taken off by wires 32 and 33 and passed through a low directional filter 34 to the input of amplifier 35. After amplification the energy passes through another low directional filter 36 and is supplied to a longitudinal circuit through the connection between ground and the junction terminal of capacitors 37 and 38 connected in series across the line wires. Since a strong inductive field is set up by the energy in the longitudinal circuit the train V2 operating somewhere between repeater points AL and BW will receive the energy for operating the corresponding receiver. Also any train between the repeater points AL and BE will pick up the energy. It is to be seen therefore that the energy sent out from the transmitter TC1 at terminal station E is available on a longitudinal circuit for reception by trains at all points within 80 miles of the terminal E. The operator could have selected transmitter TC2 and the transmission of the energy would be in a similar manner. Furthermore, both transmitters TC1 and TC2 could have been used simultaneously for sending two conversations if desired.

In much the same way an operator at terminal station W can communicate with trains. Assuming the operator at terminal station W uses his transmitter TC1 and energy is applied to a transverse circuit to flow to the repeater point AW, the energy is here taken off the transverse circuit and passed through a low directional filter 39, amplifier 40 and second low directional filter 41 to the line wires L1 and L2 in a longitudinal circuit and the energy becomes available for inductively influencing the receiving apparatus of a train, such as train V1, somewhere between the point AW and terminal W. Also, any train operating between repeater point AW and the next repeater point BW will pick up the energy. At repeater point BW energy from the longitudinal circuit is passed through a first circuit channel including low directional filter 42, amplifier 43 and low directional filter 44 to a transverse circuit of the line wires.

At repeater point AL the energy is taken off the transverse circuit by wires 32 and 33 and passed by the first circuit channel including low directional filter 34, amplifier 35 and low directional filter 36 and applied to the longitudinal circuit of the line wires. The energy thus applied to the longitudinal circuit becomes available to influence the receiving apparatus of train V2 between repeater points BW and AL and any other train operating between the points AL and BE.

At the repeater point BW a low pass filter 45 is interposed in the line wires similar to the low pass filter 31 at the point BE, filter 45 serving for the same purpose as the filter 31.

It is to be pointed out that the equipment at repeater point BW blocks further transmission to the west of the energy sent out from station E and the equipment at repeater point BE blocks further transmission to the east of the energy sent out from station W.

It follows that the operator at either terminal station W or E can transmit communication energy to any train within 80 miles of the station, and any train, such as train V2, operating through the 40 miles between repeater points BW and BE can receive communication energy from either station W or E.

In describing transmission from trains to terminal stations, I shall first take up the case of train V3 transmitting to station E. The operator on the train V3 would condition his transmitting apparatus TA to supply communication current using the carrier frequency C3 or C4 as the case may be. Considering that carrier C3 is used, this current will flow in the sending circuit of train V3 and create an electromotive force in the longitudinal circuit of the line wires, due to the inductive relationship of the sending circuit of train V3 with the line wires. Energy thus caused to flow in the longitudinal circuit will be passed by the second channel HC at the repeater point AE and the amplified energy will be applied to the transverse circuit of the line wires. The energy thus applied to the transverse circuit is passed by the HDF directional filter 46 at station E and applied to the receiver RC3.

Similarly, energy can be transmited from the train V4 to the station E, the operator on the train V4 conditioning the transmitting apparatus to apply to the sending circuit current of the carrier C3, and this current will be transferred to the longitudinal circuit of the line wires due to the inductive relationship between the sending circuit of the train and the line wires. The current from the longitudinal circuit will be passed at the repeater point AE through the second channel HC to the transverse circuit and thence passed by the filter 46 to the corresponding receiver RC3 at station E.

Transmission from train V2 to both the terminal stations is effected in multiple. With the transmitting apparatus on train V2 conditioned to supply carrier current C3, the energy is inductively transferred to the longitudinal circuit of the line wires. At repeater point AL the energy from the longitudinal circuit is passed through the second channel, including filter 47, amplifier 48 and filter 49 to the transverse circuit. Part of the energy of the transverse circuit flows to repeater point BE where it is taken off by wires 29 and 30 and passed through the second channel including filter 50, amplifier 51 and filter 52 to the longitudinal circuit east of the repeater point BE. At the repeater point AE this energy is transferred from the longitudinal circuit to the transverse circuit through the second channel HC, and the energy from the transverse circuit is applied to the receiving apparatus at the station E.

The portion of the energy that flows west on the transverse circuit from repeater point AL is taken off the transverse circuit at repeater point BW and transferred through the second channel including filter 53, amplifier 54 and filter 55 to the longitudinal circuit west of the point BW. At repeater point AW the energy is taken off the longitudinal circuit and passed through the second channel including filter 56, amplifier 57 and filter 58 to the transverse circuit. At station W the energy from the transverse circuit is applied through a high carrier directional filter 59 to the corresponding receiver RC3 of station W.

It follows from the foregoing description that the apparatus of Figs. 1*a* and 1*b* has the advantages of providing a plurality of different two way conversations simultaneously between the terminal stations and the trains en route, each terminal station being able to talk with all trains operating in a predetermined adjacent portion of the division of the railway. Also that for a preselected overlap portion of the divison conversations with trains and either station are permitted.

At station E a low pass filter 60 and a choke coil 61 are interposed in the line wires L1 and L2 to isolate the communication from being carried east of that station. The filter 60 is proportioned to pass direct current and the low frequency currents used in the present telegraph, voice frequency telephone, and similar services but to block the carrier currents used for communication. The choke coil 61 is desirable to increase the impedance of the line wires to the flow of current in the longitudinal circuit but introduces only a low resistance to a transverse circuit. In the case of parallel line wires, such as the line wires L3 and L4, a longitudinal choke coil 62 would preferably be used to avoid transmission to the east of the station E, due to the distributed capacitance and inductance between the line wires L1 and L2 and the other wires on the same pole line. Similarly, a low pass filter 63 and choke coils 64 and 65 are provided at the terminal station W. With the line wires L1 and L2 thus isolated at each terminal station E and W, communication service can be furnished over the line wires L1 and L2 east of station E and west of station W by providing equipment similar to that shown in Figs. 1*a* and 1*b* for the additional territory.

Fig. 2 shows an embodiment of the invention which uses one carrier frequency or a group of carrier frequencies for all transmissions to the west and another carrier frequency or another group of frequencies for all transmissions to the east.

In Fig. 2, a pair of line wires L1 and L2 extend along an eastbound track RT of a railway having an east terminal station E and a west terminl station W, the same as in Figs. 1*a* and 1*b*. I shall assume that the distance between stations E and W of Fig. 2 is such that repeater points C and D and transfer point CD are required. In this arrangement, in order to prevent two repeater equipments simultaneously repeating the same communication energy, it is necessary to interpose in the line wires low pass filters 66 and 67 at the repeater points C and D, respectively, as well as low pass filters 60 and 63 at the terminal stations. Also, coils similar to the choke coils 61, 65, 62 and 64 of Figs. 1*a* and 1*b* would preferably be provided at the stations and at the repeater points C and D of Fig. 2.

At the terminal station E, the transmitting apparatus includes a transmitter TW and the receiving apparatus includes a receiver RE, the transmitter TW and the receiver RE in multiple being connected to the line wires L1 and L2 in a longitudinal circuit. The transmitter TW is capable of supplying communication current of a west carrier frequency *fw*, and the receiver RE is responsive to communication current of an east carrier frequency *fe*. Filters WF and EF at station E are directional band pass filters proportioned to pass carrier frequencies *fw* and *fe*, respectively. That is, filter EF is a directional filter for transmission to the east and filter WF is a directional filter for the current transmitted to the west.

Similarly, the terminal station W is provided with a transmitter TE capable of supplying current of the east carrier frequency *fe* and a receiver RW responsive to the west carrier frequency *fw*, and the transmitter TE and receiver RW in multiple are connected to the longitudinal circuit of the line wires, a directional band pass filter EF being interposed in the connection for the transmitter TE and a directional filter WF being interposed in the connection for the receiver RW.

In Fig. 2 each train is provided with transmitting apparatus TA1 and receiving apparatus RA1, which are connected to circuit elements inductively associated with the longitudinal circuit of the line wires the same as in Figs. 1*a* and 1*b*. The transmitting apparatus TA1 would preferably include two transmitters, one capable of supplying a carrier current of the frequency *fe* for transmission to the east and the other capable of supplying a carrier frequency *fw* for transmission to the west. Likewise, the receiving apparatus would include at least two receivers, one responsive to the east carrier frequency *fe* and one responsive to the west carrier frequency *fw*.

In the case a plurality of duplex conversations are desired, then a group of carrier frequencies for transmission to the east would be provided and a corresponding but different group of carrier frequencies for transmission to the west would be provided, and the equipments at the terminal stations and on the trains would include additional transmitters and receivers, there being an individual transmitter and receiver for each carrier used.

It is believed that the apparatus at the repeater points C and D, and transfer point CD will best be understood by a description of the operation of the apparatus, and in describing the operation of the apparatus of Fig. 2, I shall first assume that communication is desired between the terminal station E and train 68 operating somewhere between terminal W and the repeater point D. The operator at terminal E would energize the transmitter TW to supply communication current of the carrier frequency *fw* to the longitudinal circuit at station E. The energy is transmitted over the longitudinal circuit to repeater point C where it is passed through a circuit channel including a west directional filter 69, amplifier 70 and a second west directional filter 71. The energy thus amplified is applied to the transverse circuit extending west of the repeater point C. This energy is then transmitted over the transverse circuit to the repeater point D where it is passed through a circuit channel including west directional filter 72, amplifier 73 and west directional filter 74 to a longitudinal circuit of the line wires. The field created by this longitudinal circuit west of the repeater point D creates a field which is picked up by the receiving apparatus of train 68. Also, this energy of the longitudinal circuit is available at the terminal station W for effectively influencing the receiving apparatus RW at that station. The energy supplied to the longitudinal circuit at station E would create a field that would be available for effectively influencing the receiving apparatus on a train 75 operating between the repeater station C and the terminal station E.

At the transfer point CD a first winding 76 of a transformer T1 is connected across the line wires through blocking capacitors 77 and 78 and a second winding 79 of the transformer T1 is connected to the longitudinal circuit of the line wires through a connection including ground and capacitors 80 and 81 connected in series across the line wires. Thus a portion of the energy transmitted over the transverse circuit extending between repeater points C and D is fed through the winding 76 of transformer T1 and energy is transferred to the longitudinal circuit, and the energy of this longitudinal circuit creates a field that will effectively influence the corresponding receiving apparatus of a train 88 operating somewhere between the points C and D.

Thus the energy supplied at the terminal station E is available on a longitudinal circuit at all points along the division.

I shall next assume the train 68 answers the communication from station E. To do so, the operator on the train 68 could use the transmitter which supplies the carrier current of the east frequency *fe*. Such energy supplied to the sending circuit of train 68 will be inductively transferred to the longitudinal circuit adjacent the train between station W and point D. This energy is passed through the circuit channel including east directional filter 82, amplifier 83 and east directional filter 84 and the amplified output is applied to the transverse circuit east from repeater point D. At repeater point C the energy from the transverse circuit is passed through the circuit channel including east directional filter 85, amplifier 86 and east directional filter 87 to the longitudinal circuit extending east from repeater point C. Energy from this longitudinal circuit will be received at station E through the east filter EF and the corresponding receiver RE.

In the case the train 88 desires to transmit to station E, the operator on train 88 would energize the transmitter arranged to supply the carrier frequency *fe* and this energy could be inductively transferred to the longitudinal circuit. At the point CD energy from the longitudinal circuit would be passed through transformer T1 to the transverse circuit and energy from this transverse circuit would be passed at repeater point C through the circuit channel including filters 85 and 87 and amplifier 86 to the longitudinal circuit extending east from repeater point C and current from this longitudinal circuit would be effectively received at the station E. Transmission from train 75 to station E would be through the longitudinal circuit between repeater point C and station E, in the usual manner.

For the operator at terminal W to communicate with any of the trains 68, 75 or 88, he would use his transmitter TE to supply energy of the east carrier frequency to the longitudinal circuit and such energy would create a field which would inductively influence a corresponding receiver on train 68. At repeater point D a portion of the energy of the longitudinal circuit is passed through the circuit channel including the east filters 82 and 84 and amplifier 83 to the transverse circuit. At repeater point C energy from the transverse circuit is passed through the circuit channel including filters 85 and 87 and amplifier 86 to the longitudinal circuit east of point C, and energy of this longitudinal circuit would be available to influence the corresponding receiver on train 75 and also to influence the receiver at station E. A portion of the energy of the transverse circuit flowing between points D and C is transferred by the equipment at the point CD from the transverse circuit to the longitudinal circuit and the field set up by the longitudinal circuit would effectively influence the corresponding receiver of train 88.

Transmission from any of the trains 68, 75 and 88 to the west terminal station W is accomplished by use of the west carrier frequency *fw*, the energy being transferred at the repeater points in a manner that will be readily understood by an inspection of Fig. 2 taken in connection with the description of the transfer of energy from the trains to the east terminal station E.

It is to be observed that in Fig. 2 the operator on train 68 can communicate with either train 88 or 75 by transmitting on the east carrier frequency and either train 75 or 88 can reply to train 68 by transmitting on the west carrier frequency. That is, each train can communicate with any other train on the division by proper use of the east and west carrier frequencies.

It is also to be observed that at point CD the transfer of energy from the transverse to the longitudinal circuit and vice versa is effected without amplification.

The apparatus of Fig. 2 has the advantages of providing communication between each terminal station and all trains of the division and each train can converse with the other trains en route as well as communicate with the two terminal stations.

Although I have herein shown and described but two forms of communication systems embodying my invention, it is to be understood that various changes and modifications may be made therein within the scope of the appended claims without departing from the spirit and scope of my invention.

Having thus described my invention, what I claim is:

1. In a system for communication between a vehicle operating over a stretch of trackway and a wayside station, the combination comprising, a pair of line wires extending along the stretch to be inductively associated with communication equipment on the vehicle due to the line wires in parallel with their distributed capacitance to ground forming a longitudinal circuit, said line wires adaptable of being included in series in a transverse line circuit, means to couple communication equipment at said station to said line wires to supply energy thereto, means at at least one preselected point along the stretch to sectionalize said line wires into a plurality of sections which are independent of each other with respect to the longitudinal and transverse circuits for said communication energy, repeater means at each said sectionalizing point, said repeater means connected to said line wires each side of said sectionalizing means to transfer energy from the line wires formed as a transverse circuit to the line wires formed as a longitudinal circuit and vice versa, and other transfer means located at points of selected ones of said sections and connected to said line wires to transfer said communication energy of the longitudinal line circuit to the transverse line circuit of the section and vice versa, said transfer of energy by said repeater and transfer means providing effective communication between said station and said vehicle throughout said stretch.

2. In a system for two-way communication between a vehicle operating over a division of trackway and a terminal station at one end of the division, the combination comprising, a pair of line wires extending along the trackway to be inductively associated with circuit elements carried on said vehicle due to the longitudinal circuit formed by said line wires in parallel and their distributed capacitance and conductance to ground, said line wires in series adaptable of being included in a transverse line circuit, communication equipment on the vehicle connected to said circuit elements to transfer communication energy to and from the longitudinal circuit, other communication equipment at said station coupled to the line wires to transfer communication energy to and from the transverse circuit of the line wires, a plurality of repeater equipments each including amplifying means and located one at each of a plurality of preselected points along said division, and said station and repeater equipments connected to said line wires to supply the communication energy to longitudinal circuits of the line wires for the entire portion of the division for communication with the vehicle at all points along the trackway and to supply such energy to transverse circuits of the line wires for preselected portions of the division for transmission of the communication energy.

3. In a system for two-way communication between vehicles operating over a division of trackway and a terminal station at one end of the division, the combination comprising, a pair of line wires extending along said trackway to be inductively associated with circuit elements carried on said vehicles due to the longitudinal circuit formed by the line wires in parallel and their distributed capacitance and conductance to ground, said line wires in series adaptable of being included in a transverse line circuit, communication equipment on each vehicle operable to transmit on a first carrier frequency and receive on a second carrier frequency and each such equipment connected to said circuit elements of the same vehicle to transfer such energy to and from said longitudinal circuit, other communication equipment at said station operable to transmit on said second carrier frequency and to receive on said first carrier frequency and having connections with said line wires, repeater equipment at a preselected point along said division and including a first and a second circuit channel, said first circuit channel including an amplifier and a filter to amplify and pass said first carrier frequency, said second channel including an amplifier and a filter to amplify and pass said second carrier frequency, and said repeater equipment having connections to said line wires for said first circuit channel to transfer such communication energy from the longitudinal circuit to the transverse circuit and said second channel to transfer the energy from the transverse circuit to the longitudinal circuit.

4. In a system for two-way communication between vehicles operating over a division of trackway and a terminal station at one end of the division, the combination comprising, a pair of line wires extending along said trackway to be inductively associated with circuit elements carried on said vehicles due to the longitudinal circuit formed by the line wires in parallel and their distributed capacitance to ground, communication equipment on each vehicle operable to transmit on a first carrier frequency and receive on a second carrier frequency and each such equipment connected to said circuit elements of the same vehicle to transfer such energy to and from said longitudinal circuit, other communication equipment at said station operable to transmit on said second carrier frequency and to receive on said first carrier frequency and having connections with a transverse circuit including said line wires in series, a plurality of repeater equipments one at each of a plurality of preselected points along the division each such repeater equipment including two circuit channels one of which is effective to amplify and pass energy of said first carrier frequency in one direction and the other of which channels is effective to amplify and pass energy of said second carrier frequency in the opposite direction, each said repeater equipment connected to said line wires for a selected one of its circuit channels to transfer energy from a longitudinal circuit to a transverse circuit of the line wires and the other one of its channels to transfer energy from the transverse circuit to the longitudinal circuit of the line wires, and other transfer means for each of said sections having connections to said line wires to transfer energy from the longitudinal to the transverse line circuit and vice versa.

5. In a system for communication between a vehicle operating over a division of trackway and a terminal station located at one end of the division, the combination comprising, a pair of line wires extending through the division within effective inductive range of the trackway, a vehicle circuit element disposed to inductively pick up communication current from a longitudinal circuit formed by said line wires in parallel and their distributed capacitance to ground, a vehicle carried receiver connected to said circuit element and responsive to such communication current, a terminal station transmitter connected across said line wires to supply such communication current to a transverse circuit of said line wires, repeater equipment including an amplifier at each of three spaced points along the division; and said repeater equipments connected to the line wires for a first one to transfer said current from the transverse circuit to the longitudinal circuit, a second one to transfer the current from the longitudinal circuit to the transverse circuit and a third one to transfer the current from the transverse circuit to the longitudinal circuit.

6. In a system for communication between vehicles en route over a trackway division and terminal stations located one at each end of the division, the combination comprising, a pair of line wires extending through the division within effective inductive range of the trackway, circuit elements mounted on each said vehicle for inductive relationship to a longitudinal circuit of the line wires, communication equipment at each of said stations having a transmitter to supply current of a first carrier frequency and a receiver responsive to current of a second carrier frequency, other communication equipments one on each of said vehicles and having a transmitter to supply current of said second carrier frequency and a receiver responsive to current of said first carrier frequency, each said vehicle transmitter and receiver connected to the circuit element of the same vehicle for inductive transfer of energy to and from the longitudinal circuit, each said station transmitter and receiver connected across said line wires for transfer of energy to and from a transverse circuit of the line wires, repeater equipments one at each of a plurality of preselected points along the division, each said repeater equipment having two circuit channels each including an amplifier and a filter, a first one of said channels disposed to pass said first carrier frequency and a second one of said channels disposed to pass said second carrier frequency, and each said repeater equipment connected to said line wires for a preselected one of its channels to transfer energy from the the transverse circuit to the longitudinal circuit and its other channel to transfer energy from the longitudinal circuit to the transverse circuit.

7. In a system for communication between vehicles en route over a trackway division and terminal stations located one at each end of the division, the combination comprising, a pair of line wires extending through the division within effective inductive range of the trackway, communication equipment at each of said stations operable to send on a first carrier frequency and to receive on a second carrier frequency, each said station equipment connected across said line wires to send and receive through a transverse circuit of the line wires, other communication equipment on each of said vehicles operable to send on said second carrier frequency and to receive on said first carrier frequency, each said vehicle equipment connected to circuit elements to inductively send and receive through a longitudinal circuit of the line wires, repeater equipment located at five points spaced to divide said trackway into six substantially equal sections, each said repeater equipment having two circuit channels one of which includes an amplifier and a filter to pass said first carrier frequency and the other including an amplifier and a filter to pass said second carrier frequency; said first, third and fifth repeater equipments connected to said line wires for their first circuit channel to transfer energy from the transverse to the longitudinal circuit and the second circuit channel to transfer energy from the longitudinal to the transverse circuit; and said second and fourth repeater equipments connected to the line wires for their first circuit channel to transfer energy from the longitudinal to the transverse circuit and the second circuit channel to transfer energy from the transverse to the longitudinal circuit.

8. In a system for communication between vehicles en route over a trackway division and terminal stations one at each end of the division the combination comprising, a pair of line wires extending through the division in effective inductive range of the trackway, communication equipment at each of said stations operable to transmit communication currents each using an individual carrier frequency of a first group of carriers and to receive communication currents each using an individual carrier frequency of a second group of carriers, each said station equipment connected to said line wires to send and receive on a transverse circuit of the line wires, communication equipments on each of said vehicles operable to transmit communication currents each using an individual carrier of said second group of carriers and to receive communication currents each using an individual carrier of said first group of carriers, each said vehicle equipment connected to circuit elements inductively associated with a longitudinal circuit of said line wires, repeater equipments located one at each of a plurality of preselected points along the division and each having two circuit channels one to pass only said first group of carriers and the other to pass only said second group of carriers, and said repeater equipments connected to said line wire to transfer energy from the transverse circuit to the longitudinal circuit, as required to provide a plurality of conversations simultaneously between each station and vehicles in a preselected portion of the division adjacent the station and between both stations and vehicles in a given overlap portion of the division.

9. In a system for communication between vehicles en route over a trackway division and terminal stations one at each end of the division, the combination comprising, a pair of line wires extending through the division in effective inductive range of the trackway, said stations having communication equipments for the equipment at a first one of the stations to send on a first carrier frequency and receive on a second carrier frequency and the equipment at a second one of the stations to send on said second carrier frequency and receive on said first carrier frequency, each said station equipment connected to said line wires formed as a longitudinal circuit including said line wires in parallel and their distributed capacitance to ground, each said vehicle having communication equipment to send and receive on either of said carrier frequencies, and circuit elements on each of said vehicles connected to the vehicle equipment and mounted for inductive relationship with the longitudinal circuit of said line wires.

10. In a system for communication between vehicles en route over a trackway division and terminal stations one at each end of the division, the combination comprising, a pair of line wires extending through the division in effective inductive range of the trackway, said stations having communication equipments for the equipment at a first one of the stations to send on a first carrier frequency and receive on a second carrier frequency and the equipment at a second one of the stations to send on said second carrier frequency and receive on said first carrier frequency, each said station equipment connected to said line wires formed as a longitudinal circuit including said line wires in parallel and their distributed capacitance to ground, each said vehicle having communication equipment to send and receive on either of said carrier frequencies, circuit elements on each of said vehicles connected to the vehicle equipment and mounted for inductive relationship with the longitudinal circuit of said line wires, repeater equipment including a first and a second circuit channel at two points along the division and connected to the line wires to transfer energy from the longitudinal circuit to a transverse circuit, said first and second circuit channels including filters to pass said first and second carrier frequencies respectively, and transfer equipment intermediate said two repeater points and including a transformer connected to said line wires to transfer energy from said transverse circuit to a longitudinal circuit and vice versa.

11. In a system for communication between vehicles en route over a trackway division and east and west terminal stations of the division, the combination comprising, a pair of line wires extending between said stations to be continuously within effective inductive range of the trackway, said east terminal station having communication equipment to send on a west carrier frequency and receive on an east carrier frequency, said west terminal station having communication equipment to send on said east carrier frequency and receive on said west carrier frequency, each said station equipment connected to said line wires formed as a longitudinal circuit including said line wires in parallel and their distributed capacitance to ground, communication equipment on each said vehicle and each operable to send and receive on both said carrier frequencies, each said vehicle equipment inductively associated with the line wires formed in a longitudinal circuit, an east repeater equipment connected to the line wires to transfer said west carrier from the longitudinal to a transverse circuit and said east carrier from the transverse to the longitudinal circuit, a west repeater equipment connected to the line wires to transfer said east carrier from the longitudinal to the transverse circuit and said west carrier from the transverse to the longitudinal circuit, and transfer equipment intermediate said repeater equipments connected to the line wires to transfer either carrier from the transverse to the longitudinal circuit and vice versa.

12. In combination, a stretch of trackway, a vehicle to travel said trackway, a pair of line wires extending along said stretch within effective inductive range of said trackway, communication equipment on said vehicle operable to supply and to respond to carrier frequency currents and connected to circuit elements inductively associated with said line wires due to the longitudinal circuit formed by the line wires in parallel and their distributed capacitance to ground, a wayside station, communication equipment at said station operable to supply and to respond to said carrier frequency currents and having connections across said line wires at one end of said stretch to transfer such current to and from a transverse circuit of the line wires, and transfer means including a transformer located at an intermediate point of said stretch and having one winding connected to the transverse circuit of said line wires and a second winding connected to the longitudinal circuit of the line wires.

13. In a system for communication between vehicles en route over a trackway division and a terminal station at one end of the division, the combination comprising, a pair of line wires extending along the division in effective inductive range of the trackway, said station having communication equipment to send on a first carrier frequency and to receive on a second carrier frequency, said station equipment connected to a longitudinal circuit formed by said line wires in parallel and their distributed capacitance to ground, said line wires in series adaptable of being included in a transverse circuit, each said vehicle having communication equipment to send and receive on said second and first carrier frequencies respectively, circuit elements on each of said vehicles connected to the vehicle equipment and mounted for inductive relationship with a longitudinal circuit of said line wires, repeater equipment at a point along the division spaced from said station and including a first and a second circuit channel, said first circuit channel adapted to pass only said first carrier frequency and connected to the line wires to transfer energy from the longitudinal circuit to the transverse circuit, said second circuit channel adapted to pass only said second carrier frequency and connected to the line wires to transfer energy from the transverse circuit to the longitudinal circuit, and transfer means located along the division spaced more remote from the station than said repeater point and including a transformer connected to said line wires to transfer energy from the transverse circuit to the longitudinal circuit and vice versa.

14. In a system for communication between a vehicle operating over a given stretch of trackway and a wayside station, a pair of line wires extending along said trackway, said line wires adaptable of being used in a longitudinal circuit formed by the line wires in parallel and their distributed capacitance to ground and in a transverse circuit including the wires in series, said line wires extending along said trackway for inductive relation between the longitudinal line circuit of the wires and equipment supplying a given communication energy mounted on said vehicle, other equipment supplying said communication energy located at said station and having connections to said line wires, means at at least one preselected point along said stretch interposed in said line wires to sectionalize the wires into a plurality of different sections with respect to said longitudinal and transverse line circuits for said communication energy, repeater means including an amplifier at each of said sectionalizing points and connected to said line wires on each side of the sectionalizing means to transfer said communication energy from a longitudinal circuit of the line wires on one side of said means to a transverse circuit of the line wires on the other side of said means and vice versa, and other transfer means for designated ones of said sections connected to the line wires to transfer said communication energy from the transverse line circuit to the longitudinal line circuit and vice versa.

15. In a system for communication between a vehicle operating over a given stretch of trackway and terminal stations one for each end of said stretch, the combination comprising, a pair of line wires extending between said stations and disposed along the trackway for inductive relation with circuit elements carried on said vehicle, said line wires adaptable of being used in a transverse line circuit and in a longitudinal line circuit, communication apparatus carried on said vehicle connected to said circuit elements for inductive transfer of communication current to and from said longitudinal line circuit, other communication apparatus at each of said stations coupled to said line wires to supply energy thereto but which energy is sufficient to provide communication with the vehicle only for a given distance from the respective station and which distance is less than the length of said stretch, means interposed in said line wires at spaced points along the stretch to sectionalize the line wires into at least three sections with the end sections adjacent said stations each not greater than said given distance and the intermediate section not greater than twice said given distance, repeater means including amplifier means at each of said sectionalizing points and connected to said line wires on each side of the sectionalizing means to transfer said communication current from the transverse to the longitudinal line circuit and vice versa, and other transfer means for said intermediate section connected to said line wires at substantially the mid point of that section to transfer said communication current from the transverse to the longitudinal line circuit and vice versa.

PAUL N. BOSSART.

REFERENCES CITED

The following references are of record in the file of this patent:

UNITED STATES PATENTS

| Number | Name | Date |
|---|---|---|
| 1,453,387 | Espenschied et al. | May 1, 1923 |
| 1,803,453 | Affel | May 5, 1931 |